United States Patent
Evans et al.

(10) Patent No.: US 8,547,948 B2
(45) Date of Patent: Oct. 1, 2013

(54) ANTENNA MANAGEMENT SYSTEM

(75) Inventors: Scott Evans, Burnt Hills, NY (US); Michael Hartman, Clifton Park, NY (US); Marc Pearlman, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 569 days.

(21) Appl. No.: 11/244,549

(22) Filed: Oct. 6, 2005

(65) Prior Publication Data
US 2007/0081556 A1  Apr. 12, 2007

(51) Int. Cl.
H04H 20/67 (2008.01)

(52) U.S. Cl.
USPC ............ 370/339; 370/469; 455/421; 455/434

(58) Field of Classification Search
USPC ................ 370/252, 320, 334, 337, 347, 351, 370/468, 469; 455/41, 2, 3, 446, 435
See application file for complete search history.

(56) References Cited

U.S. PATENT DOCUMENTS

| | | | |
|---|---|---|---|
| 5,276,907 A | 1/1994 | Meidan | |
| 5,293,641 A | 3/1994 | Kallin et al. | |
| 5,422,933 A | 6/1995 | Barnett et al. | |
| 5,483,669 A | 1/1996 | Barnett et al. | |
| 5,544,171 A | 8/1996 | Godecker | |
| 5,548,812 A | 8/1996 | Padovani et al. | |
| 5,551,060 A | 8/1996 | Fujii et al. | |
| 5,579,373 A | 11/1996 | Jang | |
| 5,758,090 A | 5/1998 | Doner | |
| 5,884,036 A * | 3/1999 | Haley ............................ 709/224 |
| 6,151,502 A | 11/2000 | Padovani et al. | |
| 6,212,405 B1 | 4/2001 | Jiang et al. | |
| 6,307,849 B1 | 10/2001 | Tiedemann, Jr. | |
| 6,577,616 B1 | 6/2003 | Chaudry et al. | |
| 6,597,673 B1 | 7/2003 | Nobuyasu et al. | |
| 6,754,493 B1 | 6/2004 | Jetzek | |
| 6,754,497 B1 | 6/2004 | Ozluturk | |
| 6,958,986 B2 * | 10/2005 | Cain ............................ 370/337 |
| 7,215,926 B2 * | 5/2007 | Corbett et al. ............... 455/41.2 |
| 7,587,173 B2 * | 9/2009 | Hoffmann et al. ........... 455/63.4 |
| 2003/0063585 A1 | 4/2003 | Younis et al. | |
| 2003/0137953 A1 | 7/2003 | Chae et al. | |
| 2004/0131029 A1 | 7/2004 | Tobe et al. | |

OTHER PUBLICATIONS

Zimmermann OSI Reference Model—The ISO Model of Architecture for Open Systems Interconnection, IEEE Transactions on Communications, vol. COM-28, No. 4, Apr. 1980.*

* cited by examiner

*Primary Examiner* — Steven H Nguyen
*Assistant Examiner* — Henry Baron
(74) *Attorney, Agent, or Firm* — Tarolli, Sundheim, Covell & Tummino LLP

(57) ABSTRACT

A system maintains quality of service of a wireless network. The system includes a first layer, a second layer, and a third layer. The first layer configures a directional antenna to transmit and receive in particular sectors based on antenna gain, transmission power, and beam width. The second layer communicates a direction and range to the first layer. The third layer maintains information summarizing connectivity between a plurality of nodes. The third layer determines whether to extend the range of the signal from a predetermined default range to an extended range.

14 Claims, 5 Drawing Sheets

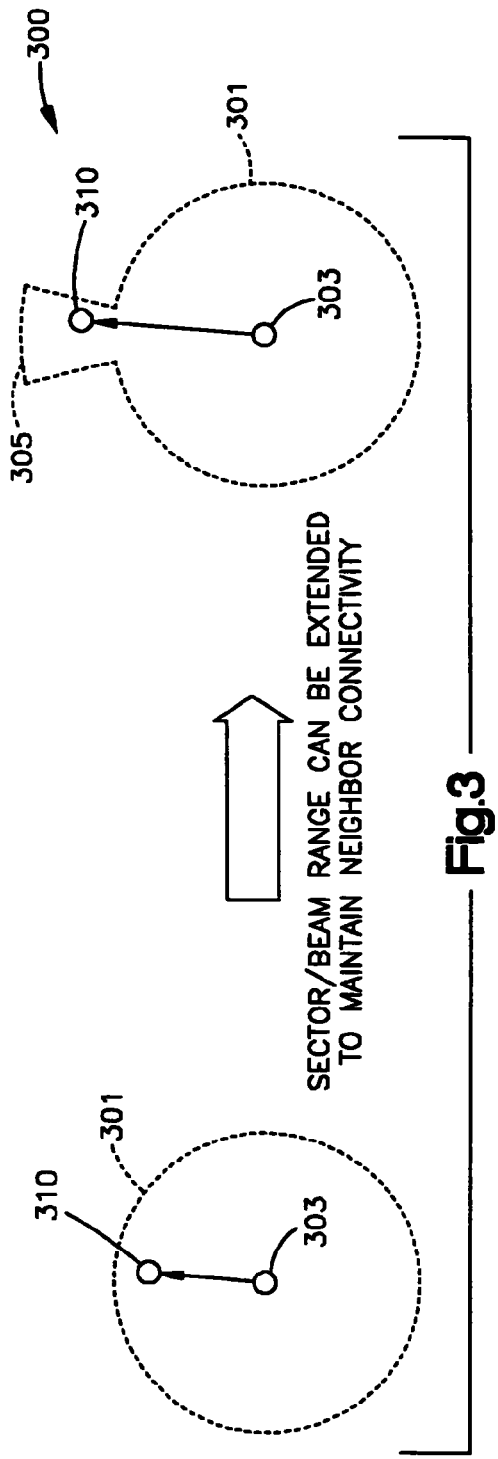
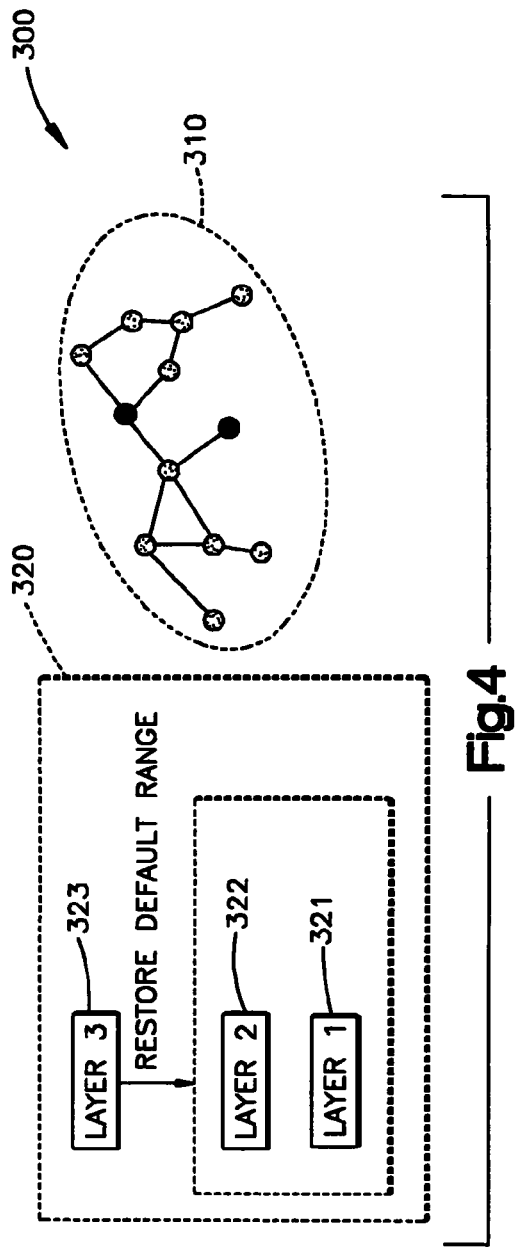
Fig.3
Fig.4

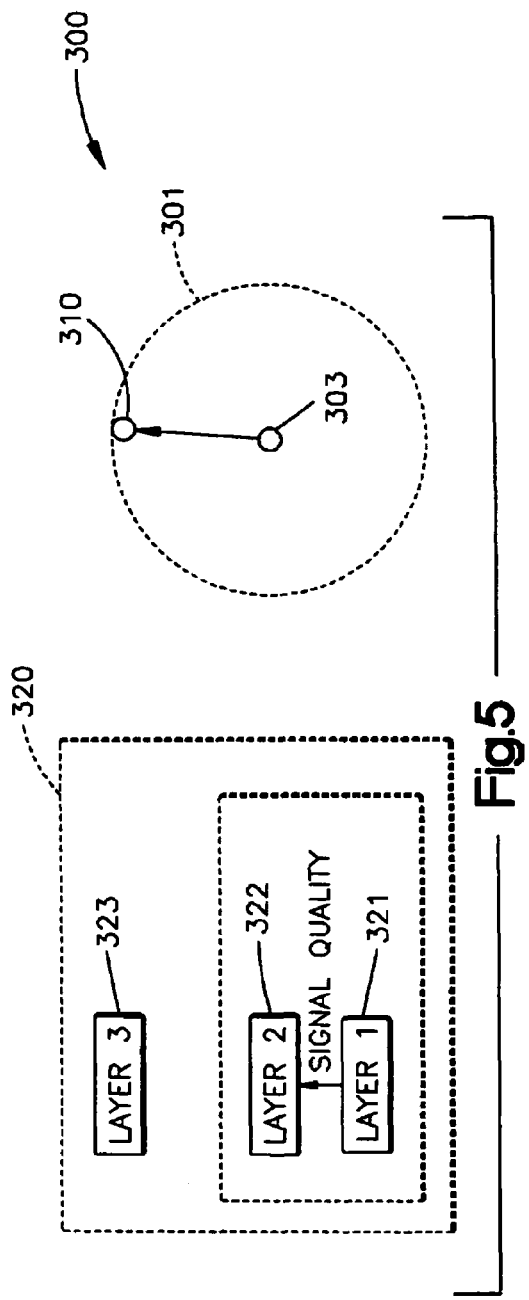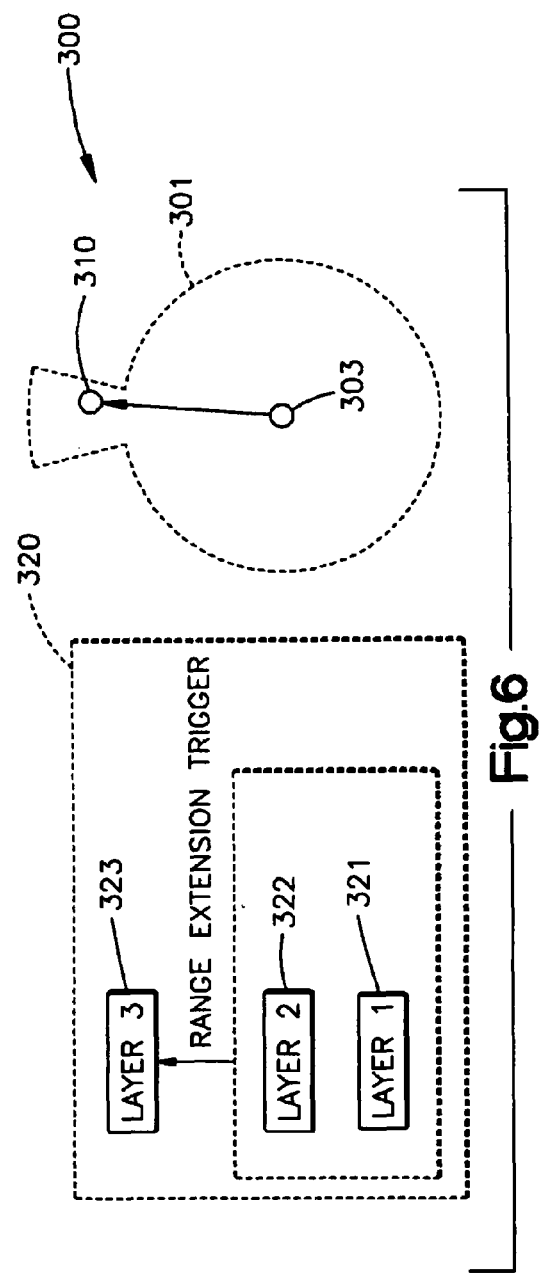

ANTENNA MANAGEMENT SYSTEM

FIELD OF INVENTION

The present invention relates to a system for managing an antenna system, and more specifically, for cross layering management of an antenna system.

BACKGROUND OF THE INVENTION

Conventional Mobile Ad hoc Networks (MANETs) are executed by an Internet Protocol (IP) and face many of the same Quality of Service (QoS) challenges that traditional hardwired networks encounter (FIG. 1). MANETs may have additional constraints, such as limited bandwidth, dynamic topologies, and reduced processing capability. Therefore, an increased probability of congestion and "jitter" may also be present.

In any network, performance and reliability are significantly impacted by the network's topology. In traditional wired networks, the topology is static, allowing for an engineered network design to meet system requirements. However, in the case of mobile ad hoc networks (MANETs), the network topology is not only dynamic, but often unstable and unpredictable. Arbitrary deployments, node mobility, variable link quality, and physical vulnerabilities conspire to undermine engineered network design and resource overprovisioning. For a network to maintain its capability and robustness, the network must adapt its operation based on accurate knowledge of system state.

Adaptive topology management schemes aim to mitigate the inherent volatility of a MANET network topology by dynamically tuning communication resources based on a combination of local and global information. To improve topological stability, a node may configure communication resource parameters in such a way as to preserve connectivity with an existing neighbor, or inhibit connectivity with a potential new neighbor.

Alternatively, a network may alter current topology to better meet system requirements. Neighbors may be selectively dropped to reduce local interference and traffic bottlenecks. Neighboring connectivity may be extended to prevent network partitioning or provide alternate routes for fault-tolerance and traffic load balancing.

The effectiveness of adaptive topology management is limited by the configurability of a node's communication resources. At the coarsest level, a node can alter its local connectivity simply by enabling or disabling its communication interfaces. Transmission power adjustments offer a finer degree of control, allowing a node to selectively establish connectivity with nodes within a certain range. More advanced antenna control mechanisms (at the transmitter and/or receiver ends) may allow local connectivity to be constrained within a more customizable region, according to a configurable antenna beam pattern.

With regard to protocol architecture, adaptive topology management depends on physical layer resources (i.e., transceivers, antennas, radio controllers, etc.) being controlled based on network state and performance metrics maintained by higher layers in the protocol stack. This is incompatible with standard layered network architectures, where protocol layers operate with limited, or no, cross-layer interaction. A more flexible cross-layer interface to effectively convey information and control directives between layers is desirable.

SUMMARY OF THE INVENTION

An example system in accordance with the present invention maintains quality of service of a wireless network. The system includes a first layer, a second layer, and a third layer. The first layer configures a directional antenna to transmit and receive in particular sectors based on antenna gain, transmission power, and beam width. The second layer communicates a direction and range to the first layer. The third layer maintains information summarizing connectivity between a plurality of nodes. The third layer determines whether to extend the range of the signal from a predetermined default range to an extended range.

An example computer program product in accordance with the present invention maintains quality of service of a wireless network. The computer program product includes: a first instruction for mechanically positioning a directional antenna; a second instruction for communicating a direction and range to the directional antenna; a third instruction for maintaining a signal between a plurality of nodes; a fourth instruction for determining whether to extend the range of the signal from a predetermined default range to an extended range; and a fifth instruction for utilizing reports and polling for determining whether to extend the range of the directional antenna to the extended range.

Another example system in accordance with the present invention maintains quality of service between a plurality of nodes. The system includes a first node and a second node. The first node has a first antenna controller and a first directional antenna. The second node has a second antenna controller and a second directional antenna. The first antenna controller determines whether the second node is outside of a first predetermined default range of the first directional antenna. The second antenna controller determines whether the first node is outside of a second predetermined default range of the second directional antenna.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a schematic representation of an example system in accordance with the present invention;

FIG. 4 is a schematic representation of the system of FIG. 3 under a different condition;

FIG. 5 is a schematic representation of the system of FIG. 3 under a still different condition;

FIG. 6 is a schematic representation of the system of FIG. 3 under a yet different condition.

DESCRIPTION OF AN EXAMPLE EMBODIMENT

Figure 1:
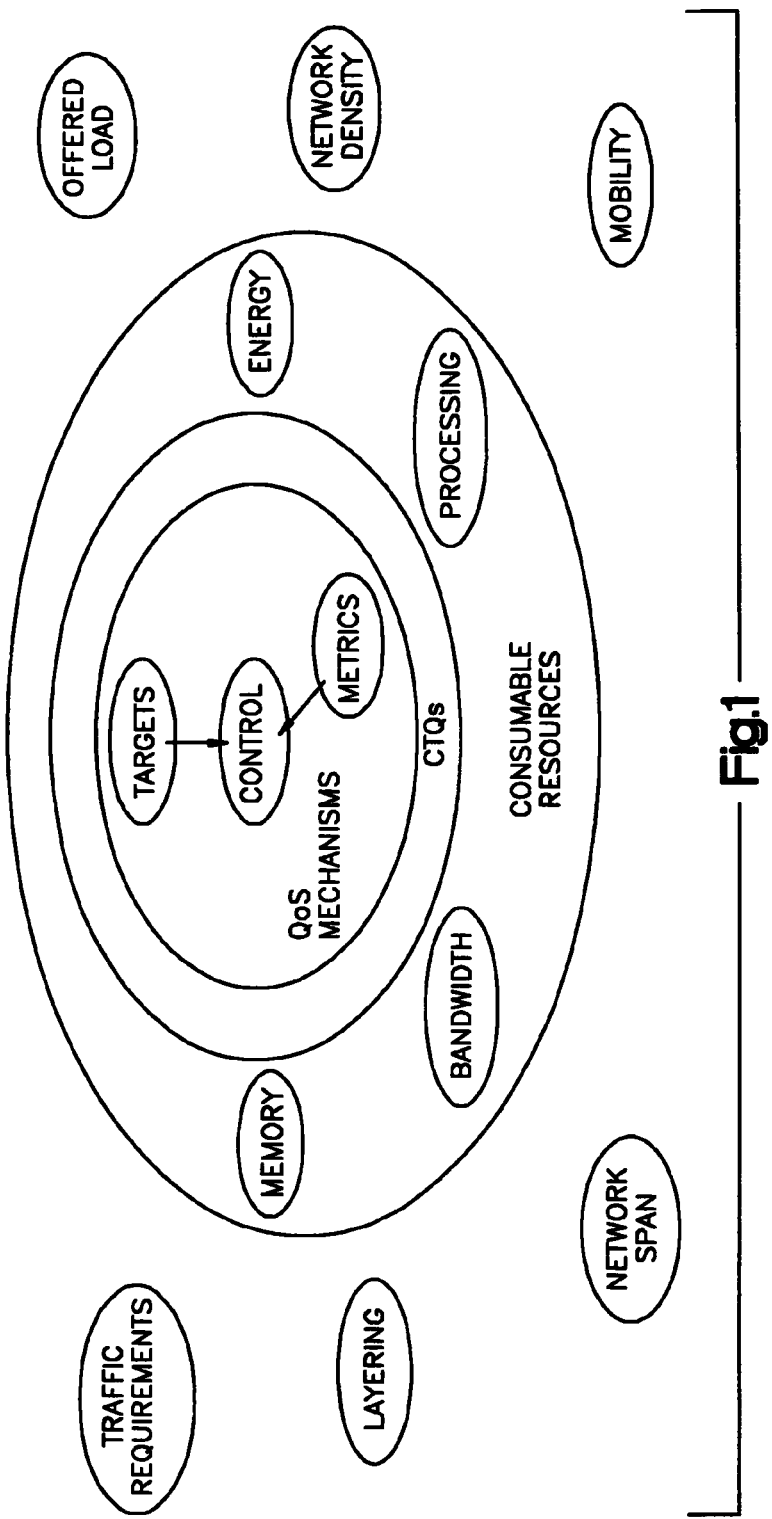
FIG. 1 is a schematic representation of an example environment in which a system in accordance with the present invention may be utilized.

A system in accordance with the present invention utilizes increased power and directional antennas to preserve neighbor connectivity of nodes in a wireless network when necessary, while also preventing unwanted interference when preserving link connectivity is not required.

An example system 300 (FIG. 4) includes a plurality of nodes 310 each having an antenna controller 320 with layer one 321, layer two 322, and layer three 323. Layer one 321 and layer two 322 may extend a range 301 of a sector, or beam, of a directional antenna 303 to maintain connectivity with a neighbor node 310 that will otherwise lose adequate connectivity.

Figure 2:
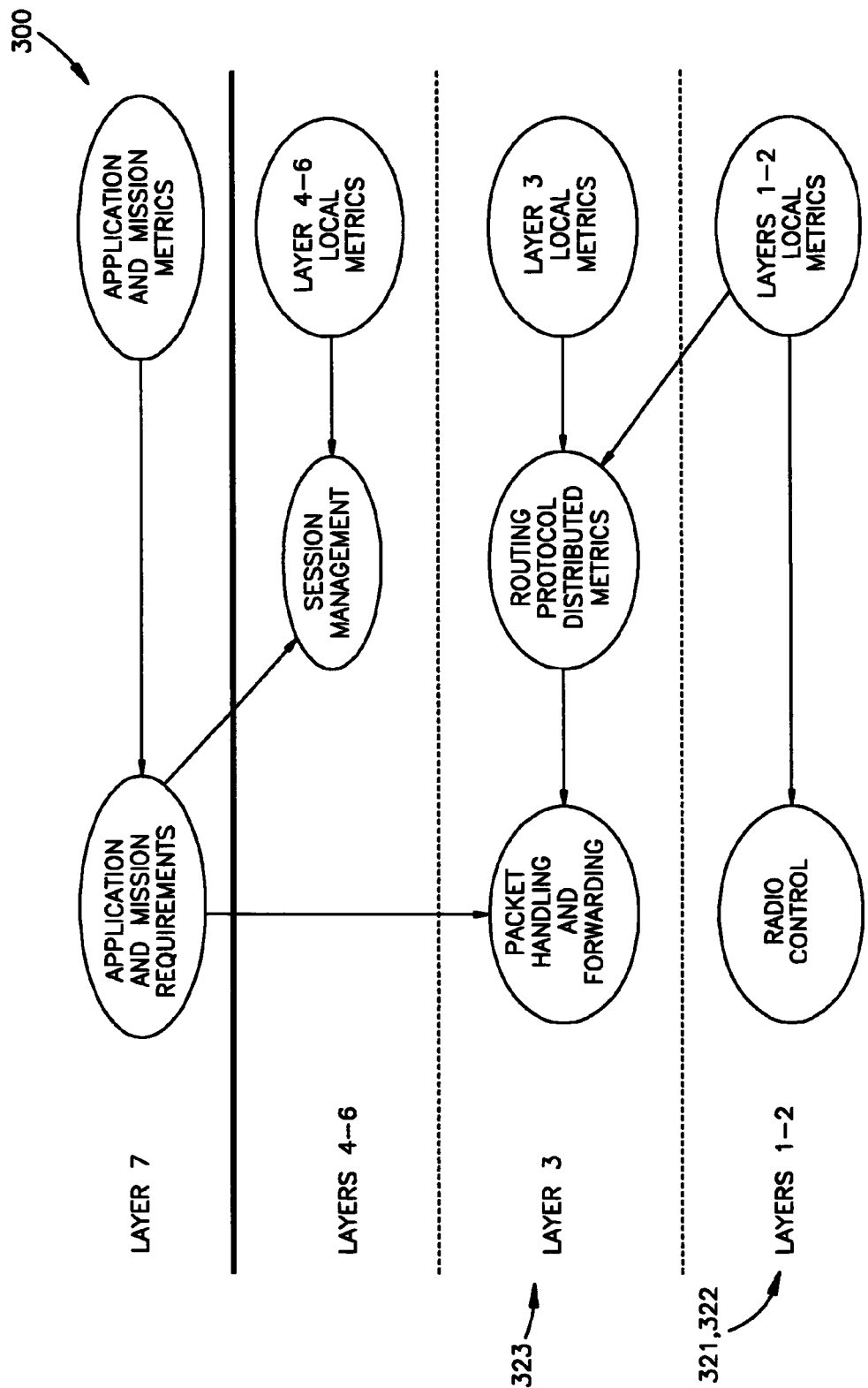
FIG. 2 is a schematic representation of example protocols of an example system in accordance with the present invention.

Layer three 323 of the antenna controller 320 may receive link information or range extension reports from lower layers (i.e., through triggered update, polling, etc.). Layer three 323 may evaluate and determine requirements for maintaining link connectivity with extended neighbor nodes (FIG. 2).

If layer three 323 determines that link connectivity is necessary (FIG. 6), layer three 323 may instruct layers one and two 321, 322 to extend a sector, or beam, to an extended range 305 (FIG. 3). If layer three 323 determines that link connectivity is unnecessary (FIG. 5), layer three may instruct layers one and two 321, 322 to restore/maintain the sector to at a default range 301.

In antenna transmission networks, transmitted power may introduce interference thereby reducing total network capacity. The nodes 310 of the system 300 may increase power so that certain key links can be maintained. However, the network must determine which links should be maintained.

By utilizing cross layer triggering, layer one 321, a physical layer, and layer two 322, a link layer, may first increase power in a sector to maintain a fading link, then be instructed by layer three 323 whether to continue maintaining that link. If losing the link does not change the connectedness of the topology of the network, the link may be dropped thereby reducing overall network interference.

Thus, the system 300 jointly optimizes connectivity and capacity of the network by minimizing interference and only expending additional energy when necessary for total network connectivity. Layers one and two 321, 322 may extend a range of a directional antenna sector to maintain connectivity with a neighbor node that will otherwise lose adequate connectivity. A range extension requirement may be reported to layer three 323 by triggered updates, polling, etc. Layer three 323 may evaluate the need to maintain link connectivity with an extended neighbor node 310. This directed range extension and triggering may thus reduce communication outages that would have resulted from lost neighbor connectivity—layer three 323, or a network layer, controls the antenna controller 320 to allow a global configuration based on impact on topology of an entire network.

Figure 7:
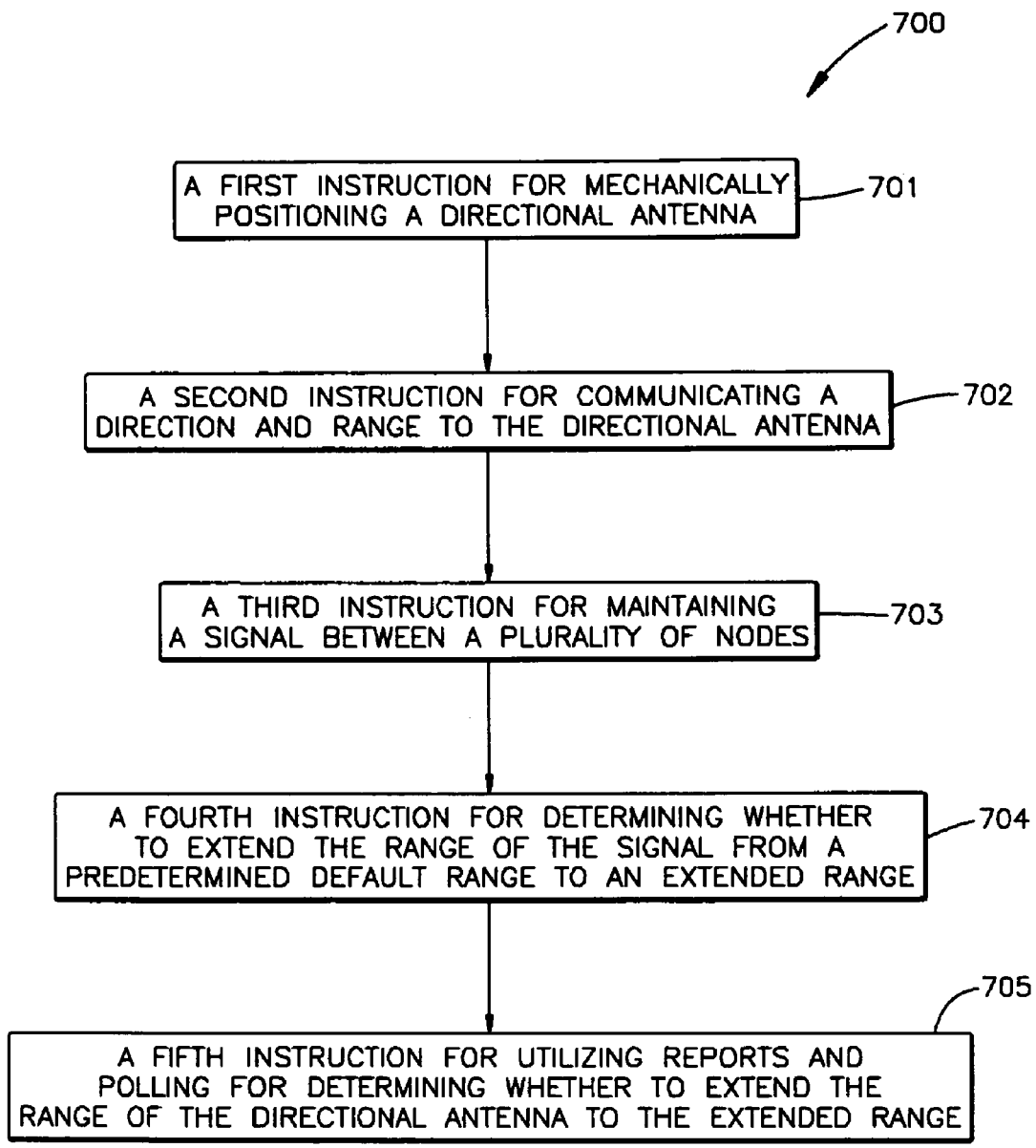
FIG. 7 is a schematic representation of an example computer program product in accordance with the present invention.

As shown in FIG. 7, an example computer program product 400 in accordance with the present invention maintains quality of service of a wireless network. The computer program product 400 includes: a first instruction 401 for mechanically positioning a directional antenna; a second instruction 402 for communicating a direction and range to the directional antenna; a third instruction 403 for maintaining a signal between a plurality of nodes; a fourth instruction 404 for determining whether to extend the range of the signal from a predetermined default range to an extended range; and a fifth instruction 405 for utilizing reports and polling for determining whether to extend the range of the directional antenna to the extended range.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A non-transitory computer readable medium storing instructions for maintaining quality of service of a wireless network, said instructions being executable by an associated processor to perform a method comprising:
   determining at one of a physical layer of an antenna controller and a link layer of an antenna controller of a first device in the wireless network that the first device will lose an adequate connection with a second device in the wireless network;
   communicating a direction and range associated with the second device from the link layer to the physical layer;
   configuring, at the physical layer, a directional antenna to extending a range of the antenna in the direction associated with the second device; and
   determining, at a network layer of the antenna controller, if the connection with the second device is necessary to preserve a connection to the wireless network, and instruct said physical and link layers to drop the connection to the second device if the connection is not necessary.

2. The non-transitory computer readable medium as set forth in claim 1 wherein the range of the antenna is extended by changing the gain of the directional antenna.

3. The non-transitory computer readable medium as set forth in claim 1 wherein the range is extended of the antenna by changing angular distribution of power of the directional antenna.

4. The non-transitory computer readable medium as set forth in claim 1 the method further comprising maintaining the range at the extended range if it is determined that the connection is necessary.

5. The non-transitory computer readable medium as set forth in claim 1 the method further comprising forwarding a packet received from the second device at the network layer.

6. The non-transitory computer readable medium as set forth in claim 1 wherein said network layer receives local metrics from said link layer.

7. A non-transitory computer readable medium storing executable instructions for maintaining quality of service of a wireless network, said executable instructions comprising:
   a first instruction for configuring a directional antenna to extend the range of the antenna in a first direction associated with a first node of a plurality of nodes comprising the wireless network, the first instruction originating at one of a physical layer and a link layer of an antenna controller associated with the directional antenna, wherein the extended range of the antenna establishes a network link between the first node and a second node;
   a second instruction, originating at a network layer of the antenna controller, for determining if the network link between the first node and the second node is necessary to maintain communication with at least the second node of the plurality of nodes; and
   a third instruction, originating at the network layer of the antenna controller and directed to at least one of the physical layer and the link layer, for reducing the range of the antenna in the first direction and dropping the network link between the first node and the second node, the network layer being configured to provide the third instruction only if the network link between the first node and the second node is determined not to be necessary to maintain communication between the first node and the second node.

8. The non-transitory computer readable medium as set forth in claim 7 further including a fourth instruction for increasing power to the directional antenna.

9. The non-transitory computer readable medium as set forth in claim 7 further including a fourth instruction for prioritizing signals from a plurality of nodes.

10. The non-transitory computer readable medium as set forth in claim 7 further including a fourth instruction for forwarding a packet received from one of the plurality of nodes to another of the plurality of nodes.

11. A non-transitory computer readable medium, storing computer executable instructions for providing an antenna controller for a directional antenna associated with a first node of a plurality of nodes comprising a wireless network, said computer executable instructions comprising:
- a physical layer configured to control the associated range of a directional antenna along each of a plurality of sectors;
- a link layer configured to communicate a direction and range of a link associated with at least a second node of the plurality of nodes to the physical layer;
- a network layer configured to determine if a link between the first and a second node of the plurality of nodes is necessary to preserve network connectivity and instruct at least one of the link layer and the physical layer to reduce the associated range of the directional antenna, thereby dropping the link between the first node and the second node if the link between the first node and the second node is not necessary to maintain network connectivity among each of the plurality of nodes.

12. The computer executable instructions as set forth in claim 11 wherein the link between the first node and the second node is dropped by changing the gain of the directional antenna.

13. The computer executable instructions as set forth in claim 11 wherein the link between the first node and the second node is dropped by changing angular distribution of power of the directional antenna.

14. The computer executable instructions as set forth in claim 11 wherein said network layer prioritizes signals from the plurality of nodes.

* * * * *